(12) United States Patent
Nishida

(10) Patent No.: US 7,837,460 B2
(45) Date of Patent: Nov. 23, 2010

(54) MOLDING METHOD AND MOLDING APPARATUS OF MOLD PRODUCT HAVING THIN FILM AT INNER SURFACE

(75) Inventor: Shoso Nishida, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 24 days.

(21) Appl. No.: 11/857,470

(22) Filed: Sep. 19, 2007

(65) Prior Publication Data
US 2008/0179778 A1    Jul. 31, 2008

(30) Foreign Application Priority Data
Sep. 19, 2006    (JP) .............................. 2006-253558

(51) Int. Cl.
*B29C 45/14* (2006.01)
(52) U.S. Cl. ...................... 425/395; 264/255; 264/553; 425/261; 425/347; 425/427; 425/441; 425/405.1
(58) Field of Classification Search ................. 425/261, 425/441, 104, 347, 427, 395, 405.1; 264/255, 264/553
See application file for complete search history.

(56) References Cited

U.S. PATENT DOCUMENTS

| | | | |
|---|---|---|---|
| 5,525,283 A | | 6/1996 | Nicolay |
| 5,573,791 A | | 11/1996 | Marcus |
| 6,042,364 A | * | 3/2000 | Nishida ...................... 425/574 |
| 6,372,170 B1 | * | 4/2002 | Nishida et al. ............... 264/255 |
| 2005/0034810 A1 | * | 2/2005 | Yamazaki et al. ......... 156/345.3 |
| 2007/0018351 A1 | * | 1/2007 | Ishizawa et al. ............. 264/255 |
| 2007/0029700 A1 | * | 2/2007 | Ishizawa et al. ............. 264/255 |
| 2008/0079191 A1 | * | 4/2008 | Nishida ...................... 264/255 |
| 2008/0138561 A1 | * | 6/2008 | Umezawa ...................... 428/61 |

FOREIGN PATENT DOCUMENTS

| | | |
|---|---|---|
| CN | 1791699 A | 6/2006 |
| JP | 02-38377 | 8/1990 |
| JP | 3677033 | 5/2005 |
| JP | 2006-239925 A | 9/2006 |

(Continued)

OTHER PUBLICATIONS

Extended European Search Report dated Oct. 31, 2008.

(Continued)

*Primary Examiner*—Kat Wyrozebski
*Assistant Examiner*—Joshel Rivera
(74) *Attorney, Agent, or Firm*—Sughrue Mion, PLLC

(57) ABSTRACT

A molding apparatus is configured by a first, a second sliding die, a first, a second fixed die, and a sliding film forming chamber. The first, the second sliding dies are moved in directions reverse to each other to take a primary molding position, a film forming position and a secondary molding position. The sliding film forming chamber includes a first, a second masking plate and are arranged to be remote from the first, the second fixed dies. Further, the sliding film forming chamber is slid in an up and down direction. The first, the second sliding dies are respectively formed with recess portions and cores, the first, the second fixed dies are respectively formed with cores and recess portions.

6 Claims, 5 Drawing Sheets

FOREIGN PATENT DOCUMENTS

| | | |
|---|---|---|
| JP | 2006-240003 A | 9/2006 |
| WO | WO 2004101253 A1 * | 11/2004 |
| WO | WO 2004101254 A1 * | 11/2004 |
| WO | 2006/095807 A1 | 9/2006 |
| WO | WO 2006095807 A1 * | 9/2006 |

OTHER PUBLICATIONS

Japanese Office Action dated Sep. 25, 2008.
Chinese Office Action dated Jul. 3, 2009.

* cited by examiner

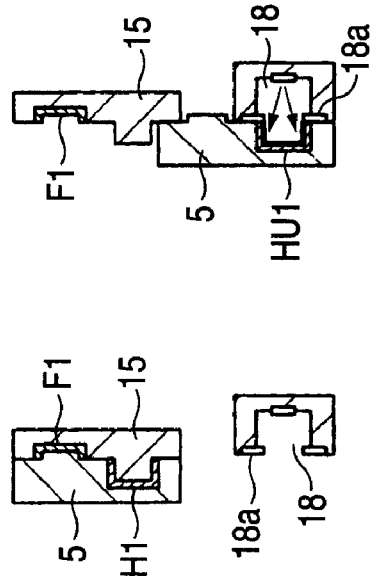
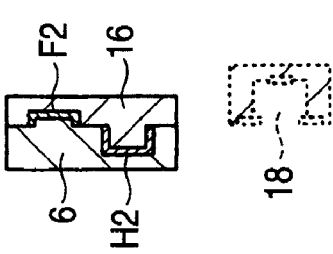
FIG. 5A FIG. 5B FIG. 5C FIG. 5D

MOLDING METHOD AND MOLDING APPARATUS OF MOLD PRODUCT HAVING THIN FILM AT INNER SURFACE

This application claims priority from Japanese Patent Application No. 2006-253558, filed on Sep. 19, 2006, the entire subject matter of which is incorporated herein by reference.

BACKGROUND OF THE INVENTION

1. Field of the Invention

The present invention relates to a molding method of a mold product having a thin film at an inner surface thereof including a primary molding step of molding a half mold product by a sliding die and a fixed die, and a film forming step of forming a thin film on one face of the half mold product provided by the step and a molding apparatus used for carrying out the molding method, further specifically, relates to a molding method of a mold product having a thin film at an inner surface thereof including a primary molding step of molding a pair of half mold products to provide bonding portions by a sliding die and a fixed die, a film forming step for forming a thin film at a surface of one of the half mold products provided by the primary molding step, and a secondary molding step of matching the one half mold product molded with the thin film by the film forming step with other half mold product of the pair of mold products and fastening the dies to bond at the bonding portions and a molding apparatus used in carrying out the molding method.

2. Description of the Related Art

As a hollow mold product having a thin film of an order of several μm at a portion of an inner surface of a hollow member, for example, a front lamp, a tail lamp or the like mounted to a vehicle can be pointed out. The lamp includes a main body portion in a recess shape attached with a bulb and a lens portion integrally attached to an opening portion of the main body portion. The main body portion is molded by, for example, injection molding, further, hung down by using an exclusive hanger at inside of a vacuum tank exclusive for film forming by masking an unnecessary portion of an outer surface or the like, successively, formed with the thin film by a film forming method mentioned later. Further, the main body portion formed with the thin film and the lens portion molded separately from the main body portion are set to respective dies and integrated by matching/butting together edges of an opening portion of the main body portion and the lens portion and injecting a molten resin to bonding portions butted together to thereby mold a hollow mold product having the thin film at an inner surface thereof.

There has been proposed a film forming method of forming the thin film at the inner surface of the main body portion or a surface of a board. For example, a sputtering method of forming the thin film by making the board intended to form the thin film and a target opposed to each other, applying a negative voltage of several kV to the target in an argon gas atmosphere of about several Pa through several tens Pa and discharging electricity, a vacuum film forming method of forming the film by containing the board and an evaporation source at inside of a vacuum vessel, an ion plating method of forming the film in vacuum under a pressure of argon gas of several Pa by applying a negative voltage of several kV to a board, a chemical film forming method, and the like has been proposed.

JP-B-2-38377 discloses a molding method of the hollow mold product by injection molding. The molding method includes primary molding of molding a pair of half hollow mold products each to provide a bonding portion at a surrounding of an opening portion thereof by a pair of cavities configured by fixed dies and sliding dies, a step of opening the dies such that one of the half mold products remains on a side of the fixed die and other of the half hollow mold products remains on a side of the sliding die, further, sliding the sliding die to a position where the bonding portions of the pair of half hollow mold products match, successively passing, fastening the dies, and secondary molding of injecting a molten resin to the bonding portions to bond thereafter.

Japanese Patent No. 3677033 discloses a molding method of a hollow mold product having a thin film at an inner surface thereof including primary molding of a pair of half mold products by the injection molding method disclosed in JP-B-2-38377, and secondary molding of opening the dies thereafter such that one of the half hollow mold products remains at the sliding die and other half hollow mold product remains on a side of the fixed die, sliding the sliding die such that the half mold product remaining at the sliding die is oppositely brought into close contact with a recess portion for film forming provided at the fixed die, forming the thin film at the inner surface of the half hollow mold product by a film forming chamber provided at the recess portion for film forming, thereafter, sliding the sliding die to a position where bonding portions of the pair of half mold products match, successively, sliding the dies, and injecting the molten resin to the bonding portions to bond together.

According to the method disclosed in Japanese Patent No. 3677033, a step of temporarily detaching the primary mold product to carry to the vacuum tank for film forming is not needed. Therefore, a failure in film forming by contaminating a film forming face brought about by adhering dirt from the hand, dust or the like to the primary mold product can be prevented in carrying the primary mold product. Further, respective steps of injection molding of the pair of half hollow mold products, forming the thin film by film forming, thereafter, bonding the pair of half hollow mold products by secondary injection molding and providing a finished product of the hollow mold product having the thin film at the inner surface can be automated.

However, in Japanese Patent No. 3677033, the film forming chamber for carrying out film forming is provided at inside of the fixed die for carrying out the primary injection molding, and therefore, a number of problems are posed. For example, the die for injection molding and the film forming chamber for film forming are provided at inside of the same die. Thus, the film forming chamber may be influenced by a temperature by injection molding to bring about a strain. Further, the film forming chamber is strained also by a stress by a die fastening force for injection molding. As a result, a hermetically closing performance for achieving vacuum necessary for film forming may be difficult to be ensured. In this way, since a vacuum degree necessary for film forming is difficult to be ensured, it may be difficult to form a film on other mold product simultaneously while carrying out injection molding. This fact poses a problem in a molding method of molding two or more of hollow mold products each having a thin film at an inner surface thereof efficiently in parallel constituting one aspect of the invention described later. Further, an adjustment of a position of the die for pertinently carrying out injection molding and an adjustment of a position of the film forming chamber for pertinently carrying out film forming cannot be carried out independently from each other since the film forming chamber is provided at inside of the fixed die. This fact also poses a problem in view of maintenance that a degree of freedom of the adjustments is low. Further, since the film forming chamber is integrated to the fixed die for injection molding, a total of the mold is enlarged. Thus, it becomes difficult to fabricate the dies, and cost for fabricating the dies becomes high.

SUMMARY OF THE INVENTION

An object of the invention is to provide a molding method of a mold product having a thin film at an inner surface thereof facilitating a fine adjustment necessary for carrying out injection molding and film forming pertinently such that the film forming chamber is not influenced by a temperature by injection molding, and is not influenced by a die fastening stress or the like and capable of fabricating a structure of the die simply at low cost and a molding apparatus used for carrying out the molding method.

In order to achieve the object, the invention is applied with a sliding die, a fixed die for injection molding, a film forming chamber for forming a thin film, the sliding die is arranged on a side of the movable disk and the fixed die and the film forming chamber are arranged on a side of a fixed disk, and the film forming chamber is constituted to be arranged to be separated from or remote from the fixed die. Further, when two kinds or more of hollow mold products having thin films at inner surfaces are molded in parallel or alternately, the film forming chamber is configured to slidingly move to a film forming position in accordance with a film forming step.

According to a first aspect of the invention, there is provided A molding method of a mold product having a thin film at an inner surface thereof, the molding method including: a primary molding including molding a half mold product by a sliding die and a fixed die; a preparing including: matching a film forming chamber with the half mold product that is molded by the primary molding and remains at the sliding die, the film forming chamber being provided separately from the fixed die and including a film forming element; and fastening the sliding die to the fixed die in order to constitute a film forming hermetically closed space by a surface of the half mold product and the film forming chamber; and a film forming including forming a thin film on the surface of the half mold product in the film forming hermetically closed space by the film forming element.

According to a second aspect of the invention, the primary molding step includes molding a pair of half mold products to provide bonding portions, the preparing including matching the film forming chamber with one half mold product of the pair of half mold products that is molded by the primary molding and remains at the sliding die, the film forming including forming a thin film on a surface of the one half mold product, the method further includes a secondary molding including: matching the one half mold product formed with the thin film in a state of remaining at the sliding die with another half mold product of the pair of half mold products that is molded by the primary molding and remains at the fixed die; and fastening the sliding die to the fixed die in order to bond the one half mold product and the another half mold product at the bonding portions thereof.

According to a third aspect of the invention, the molding method further includes: a second primary molding including molding a second pair of half mold products having bonding portions by a second sliding die and a second fixed die; a second preparing including: matching a second film forming chamber with one half mold product of the second pair of half mold products that is molded by the second primary molding and remains at the second sliding die, the second film forming chamber being provided separately from the second fixed die and including a second film forming element; and fastening the second sliding die to the second fixed die in order to constitute a film forming hermetically closed space by a surface of the one half mold product of the second pair of half mold products and the second film forming chamber; a second film forming including forming a thin film on the surface of the one half mold product of the second pair of half mold products by the film forming element; a second secondary molding including: matching the one half mold product of the second pair of half mold products formed with the thin film in a state of remaining at the second sliding die with another half mold product of the second pair of half mold products that is molded by the second primary molding and remains at the second fixed die; and fastening the second sliding die to the second fixed die in order to bond the one half mold product and the another half mold product of the second pair of half mold products at the bonding portions thereof; wherein the primary molding and the second secondary molding, the film forming and the second primary molding, and the first secondary molding and the second film forming are carried out substantially simultaneously.

According to a fourth aspect of the invention, the sliding die and the second sliding die are provided to a movable disk that is openable and closable to a fixed disk, and the film forming chamber and the second film forming chamber are provided to a sliding film forming chamber that is provided to the fixed disk and is separately from the fixed die and the second fixed die.

According to a fifth aspect of the invention, the sliding die and the second sliding die are slidable to a primary molding position, a film forming position and a secondary molding position, and the film forming chamber and the second film forming chamber are slidable to take a first film forming position and a second film forming position within the sliding film forming chamber.

According to a sixth aspect of the invention, the primary molding includes molding the one half mold product as a half hollow member.

According to a seventh aspect of the invention, the film forming includes masking the bonding portions by a masking plate provided on the film forming chamber.

According to an eighth aspect of the invention, there is provided a molding apparatus of a mold product having a thin film at an inner surface thereof including: a fixed disk including: a fixed die including a fixed side core and a fixed side recess portion; and a film forming chamber including therein a film forming element, the film forming chamber being separately provided from the fixed die; and a movable disk openable and closable to the fixed disk, the movable disk including: a sliding die including a sliding side core and a sliding side recess portion, the sliding die being slidable to a position where the sliding side recess portion matches with the film forming chamber.

According to a ninth aspect of the invention, the sliding die is slidable to positions including: a primary molding position where the sliding side core and the slide side recess portion are respectively matched with the fixed side recess portion and the fixed side core for molding a pair of mold products; a film forming position where the film forming chamber is matched with the sliding side recess portion including one half mold product of the pair of mold products molded at the primary molding position for forming a thin film on a surface of the one half mold product; and a secondary molding position where the sliding side recess portion including the one half mold product is matched with the fixed side recess portion including another half mold product of the pair of half mold products molded at the primary molding position for bonding the one half mold product and the another half mold product of the pair of half mold products.

According to a tenth aspect of the invention, the fixed disk further includes: a second fixed die including a second fixed side core and a second fixed side recess portion; and a second film forming chamber including therein a second film forming element, the second film forming chamber being separately provided from the fixed die, and the movable disk further includes a second sliding die including a second sliding side core and a second fixed side recess portion, the second sliding die is slidable to positions including: a second primary molding position where the second sliding side core and the second slide side recess portion are respectively matched with the second fixed side recess portion and the second fixed side core for molding a second pair of half mold products; a second film forming position where the second film forming chamber is matched with the second sliding side recess portion including one half mold product of the second pair of mold products for forming a thin film on a surface of the one half mold product of the second pair of mold products; and a second secondary molding position where the second sliding side recess portion including the one half mold products of the second pair of half mold products is matched with the second fixed side recess portion including another half mold product of the second pair of half mold products molded at the second primary molding position for fastening the one half mold product and the another half mold product of the second pair of half mold products.

According to an eleventh aspect of the invention, the first fixed die and the second fixed die are attached to the fixed disk in a relationship of upper and lower stages, the first sliding die and the second sliding die are provided to the movable disk in a relationship of upper and lower stages and slidably in the transverse direction, the sliding side core and the recess portion or the recess portion and the core are provided in the transverse direction to be spaced apart from each other by a predetermined interval therebetween, and the film forming chamber is attached to the fixed disk to be remote from the first and the second fixed dies by a size of covering the recess portions of the first and the second sliding dies molded with one half mold products of the pair and the other pair of half mold products.

According to a twelfth aspect of the invention, the fixed side core and the fixed side recess portion are provided in a transverse direction to be spaced apart from each other by a predetermined interval therebetween, and the second fixed side core and the second fixed side recess portion are provided in a transverse direction to be spaced apart from each other by a predetermined interval therebetween.

According to a thirteenth aspect of the invention, the sliding die and the second sliding die are slidable in directions reverse to each other, and the film forming chamber is slidable to positions including: a first position for matching with the sliding side recess portion including the one half mold product of the pair of half mold products; and a second position for matching with the second sliding side recess portion including the one half mold product of the second pair of half mold products.

According to a fourteenth aspect of the invention, the film forming chamber includes an opening portion, the opening portion includes a masking plate for masking a portion of the one half mold product included in the sliding side recess portion to be bonded to the another half mold product, and the masking plate is capable of sealing the opening portion.

According to a fifteenth aspect of the invention, a face of the opening portion is at a height substantially the same as a height of a parting line face of the fixed die and the sliding die.

According to a sixteenth aspect of the invention, the film forming element includes a target electrode, a board electrode, and a vacuuming tube.

As described above, according to the aspects of the invention, the film forming chamber is arranged to be separated or remote from the fixed die. Therefore, the film forming chamber is rarely influenced by a temperature by injection molding. Further, since the film forming chamber is arranged separately from the fixed die, the film forming chamber is difficult to be exerted with a die fastening force in injection molding and die fastening. Therefore, according to the aspects of the invention, there is achieved an effect of making the film forming chamber difficult to be exerted with thermal strain and stress strain, ensuring a hermetically closing performance necessary for molding a thin film and capable of molding a thin film having a stable high quality.

Further, there is also achieved an effect of capable of adjusting a position of the film forming chamber independently from adjusting the fixed die. Further, the film forming chamber is arranged to be separated from the fixed die, and therefore, there is a versatility in arranging the die to also achieve an effect of capable of carrying out primary molding at a center portion of the die. Further, the following effects are also achieved.

(a) The film forming chamber is provided at the fixed disk similar to the fixed die, and therefore, maintenance is facilitated.

(b) Since the film forming chamber is separately provided from the fixed die, the fixed die per se can be downsized, and die fabricating cost can be restrained.

(c) Since the fixed die and the film forming chamber are separately arranged, cleaning is also facilitated.

Naturally, according to the aspects of the invention, the film can be formed at inside of the die by using the film forming chamber without taking out a half mold product from the die in the state in which the surface of the half mold product molded by the sliding die and the fixed die remain at the sliding die, and therefore, the surface to be formed with the film is not contaminated by dirt from the hand, dust or the like.

Further, according to aspects of the invention, the first and the second mold products can efficiently be molded in parallel or alternately. At this occasion, since the film forming chamber is remote from the fixed die, the film forming chamber is not influenced by the die fastening force and heat by injection molding. Therefore, even when the film forming step is carried out substantially simultaneously with the primary, the secondary moldings as in the primary molding step and the film forming step, the film forming step and the secondary molding step, a performance of hermetically closing the film forming chamber is ensured. Thereby, two or more of high quality mold products having thin films at surfaces can efficiently be molded. Further, the film forming chamber may be slidable to the positions to match with the recess portion of the first sliding die and the recess portion of the second sliding die. At this occasion, in addition to the above-described effect, there is achieved an effect of capable of fabricating the molding apparatus of the mold product having the thin film at the inner surface inexpensively.

BRIEF DESCRIPTION OF THE DRAWINGS

FIGS. 3A to 3C illustrate views schematically showing respective molding stages by using the die shown in FIG. 2, in which FIG. 3A is a sectional view showing a state of finishing primary molding, FIG. 3B is a sectional view showing a state of opening the first sliding die, and FIG. 3C is a sectional view showing a state of forming a film;

FIGS. 4A to 4C illustrate views schematically showing molding stages successive to those shown in FIGS. 3A to 3C, in which FIG. 4A is a sectional view showing a state of opening the first sliding die after finishing to form the film, FIG. 4B is a sectional view showing a state of finishing secondary molding, and FIG. 4C is a sectional view enlarging butting portions of a main body portion and a lid member; and FIGS. 5A to 5D illustrate views showing respective stages of alternately molding a first, a second product by using the die according to the embodiment of the invention shown in FIG. 1, in which FIG. 5A is a sectional view schematically showing a state of finishing primary molding of the first product by a sliding die and a first fixed die, FIG. 5B is a sectional view schematically showing a state of forming a film of a main body portion of the first product by the sliding die and a sliding film forming chamber and finishing primary molding of the second product by a second sliding die and a second fixed die, FIG. 5C is a sectional view schematically showing a state of carrying out secondary molding by the first sliding die and the first fixed die and forming a film of a main body portion of the second product by the second sliding die and the sliding film forming chamber, and FIG. 5D is a sectional view schematically showing a state of subjecting the first product to the primary molding by the first sliding die and the first fixed die and molding the second product by subjecting the second product to secondary molding by the second sliding die and the second fixed die.

DETAILED DESCRIPTION OF THE PREFERRED EMBODIMENTS

An explanation will be given as follows of an example in which two pieces of products, that is, hollow mold products each having a thin film at inside thereof are molded in parallel. In this example, a main body portion in a substantially bowl-like shape having a thin film such as a reflecting film at an inner surface and a lid member in a shape of a thin lens for closing an opening portion of the main body portion are molded by primary injection molding, and the hollow mold product is molded by secondary injection molding of forming the thin film at the inner surface of the main body portion in a die and successively closing the opening portion of the main body portion by the lid member.

Figure 1:
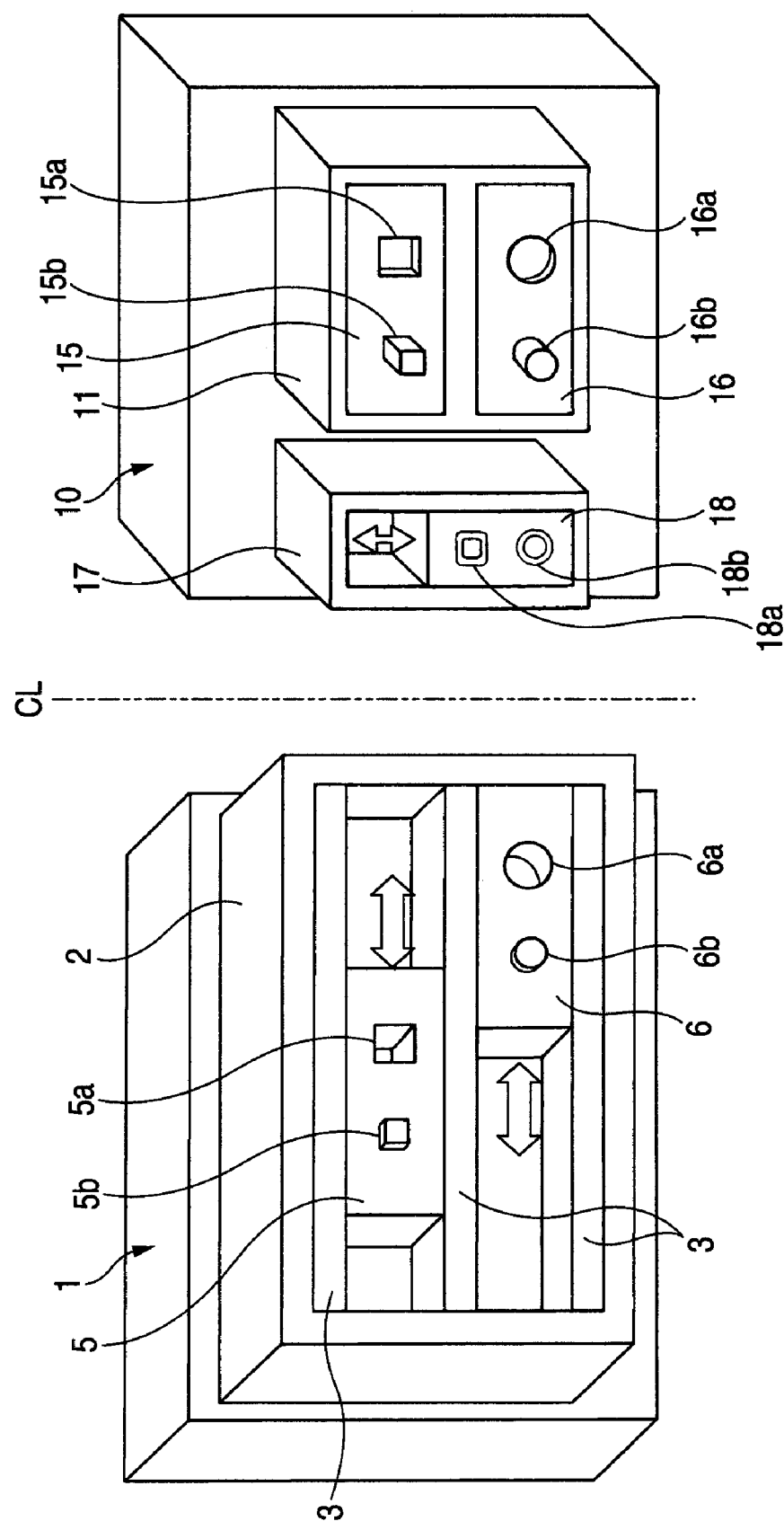
FIG. 1 is a perspective view schematically showing a die or a molding apparatus according to a first embodiment of the invention by being opened spreadingly by a parting line face.

An embodiment of a molding apparatus of the invention will be explained. FIG. 1 is a perspective view showing a molding apparatus according to a first embodiment in a state of opening parting line faces of a movable disk 1 and a fixed disk 10 spreadingly centering on a line CL. As shown in FIG. 1, according to the embodiment, a sliding die supporting member 2 in a substantially box-like shape is attached to a side of a die matching face of the movable disk 1. A first sliding die 5 slidingly moved in a horizontal direction by guide members 3, 3, . . . , is provided in an inner side of the sliding die supporting member 2. A second sliding die 6 similarly slidingly moved in the horizontal direction is provided in a lower side of the sliding die supporting member 2. In contrast, on a side of a die matching face of the fixed disk 10, a fixed die supporting member 11 and a film forming chamber constituting member 17 are provided such that they are aligned at a predetermined interval therebetween in a transverse direction. At the fixed die supporting member 11, a first fixed die 15 and a second fixed die 16 disposed on a lower side of the first fixed die 15 are respectively provided, and a sliding film forming chamber 18 is configured by the film forming chamber constituting member 17.

The first sliding die 5 and the first fixed side die 15 are dies for molding a pair of half hollow products, that is, a single piece of a hollow mold product from a main body portion and a lid member. The second sliding die 6 and the second fixed side die 16 are dies for similarly molding other hollow mold product. The first sliding die 5 includes a first sliding side recess portion 5a for molding a main body portion in a substantially bowl-like shape and a first sliding side core 5b for molding a lid member. The first fixed die 15 includes a first fixed side core 15b for constituting a cavity in cooperation with the first sliding side recess portion 5a and a first fixed side recess portion 15a for constituting a cavity similarly in cooperation with the first sliding die core 5b. The recess portions 5a, 15a are recessed from the parting line face by predetermined amounts. The recess portions 5a, 15a are larger than the cores 5b, 15b projected from the parting line face by the predetermined amounts by amounts of wall thicknesses of half mold products, that is, the main body portion and the lid member.

The second sliding die 6 includes a second sliding side recess portion 6a for molding the main body portion in the substantially bowl-like shape and a second sliding side core 6b for molding the lid member similarly although shapes, sizes and the like thereof differ. The second fixed die 16 includes a second fixed die core 16b for constituting a cavity in cooperation with the second sliding side recess portion 6a and a second fixed side recess portion 16a for constituting a cavity similarly in cooperation with the second sliding side core 6b. The recess portions 6a, 16a are recessed from the parting line face by predetermined amounts and are larger than the cores 6b, 16b projected from the parting line face by an amount of wall thicknesses of half mold products. In this way, according to the embodiment, the first, second sliding dies 5, 6, the first, the second fixed dies 15, 16 are provided, and shapes, sizes and the like of the recess portions and the cores formed at the dies 5, 6 and 15, 16 respectively differ. Therefore, for example, a right lamp of a tail lamp for a vehicle can be molded by the first sliding die 5 and the first fixed side die 15, and a left lamp thereof can be molded by the second sliding die 6 and the second fixed side 16.

According to the sliding film forming chamber 18 configured by the film forming chamber constituting member 17, sides of the parting line thereof are opened with two pieces of opening portions having different shapes and sizes according to an illustrated embodiment (details thereof will be described later). Further, surroundings of the opening portions are provided with first, second masking plates 18a, 18b for masking a main body portion or a secondary mold portion of a half hollow member for film forming. The first, the second masking plates 18a, 18b also serve as sealing means for sealing the opening portions. Thereby, for example, when a main body portion of a right lamp is formed with a film, the secondary mold portion is masked by the first masking plate 18a, and when a main body portion of a left lamp is formed with a film, the secondary mold portion is masked by the second masking plates 18b. Further, inside of the sliding forming chamber 18 is maintained in a predetermined atmosphere. In this way, according to the embodiment, the first, the second masking plates 18a, 18b are pertinently used, and therefore, when one of the masking plates is used, in order to maintain inside of the slide film forming chamber 18 in a film forming atmosphere, other of the opening portions is closed (a specific embodiment thereof is not illustrated in the drawing).

The die of the movable disk 1 constituted as described above is opened and closed relative to the fixed disk 10. However, a mold fastening apparatus is not illustrated in the drawing. Further, the first, the second sliding dies 5, 15 are alternately moved in the horizontal direction to respectively take three pieces of positions as explained in the column of operation in details. However, a driving apparatus thereof is not also illustrated. Still further, the sidling film forming chamber 18 is moved to take two positions in an up and down direction. However, a driving apparatus thereof is not also illustrated.

Figure 2:
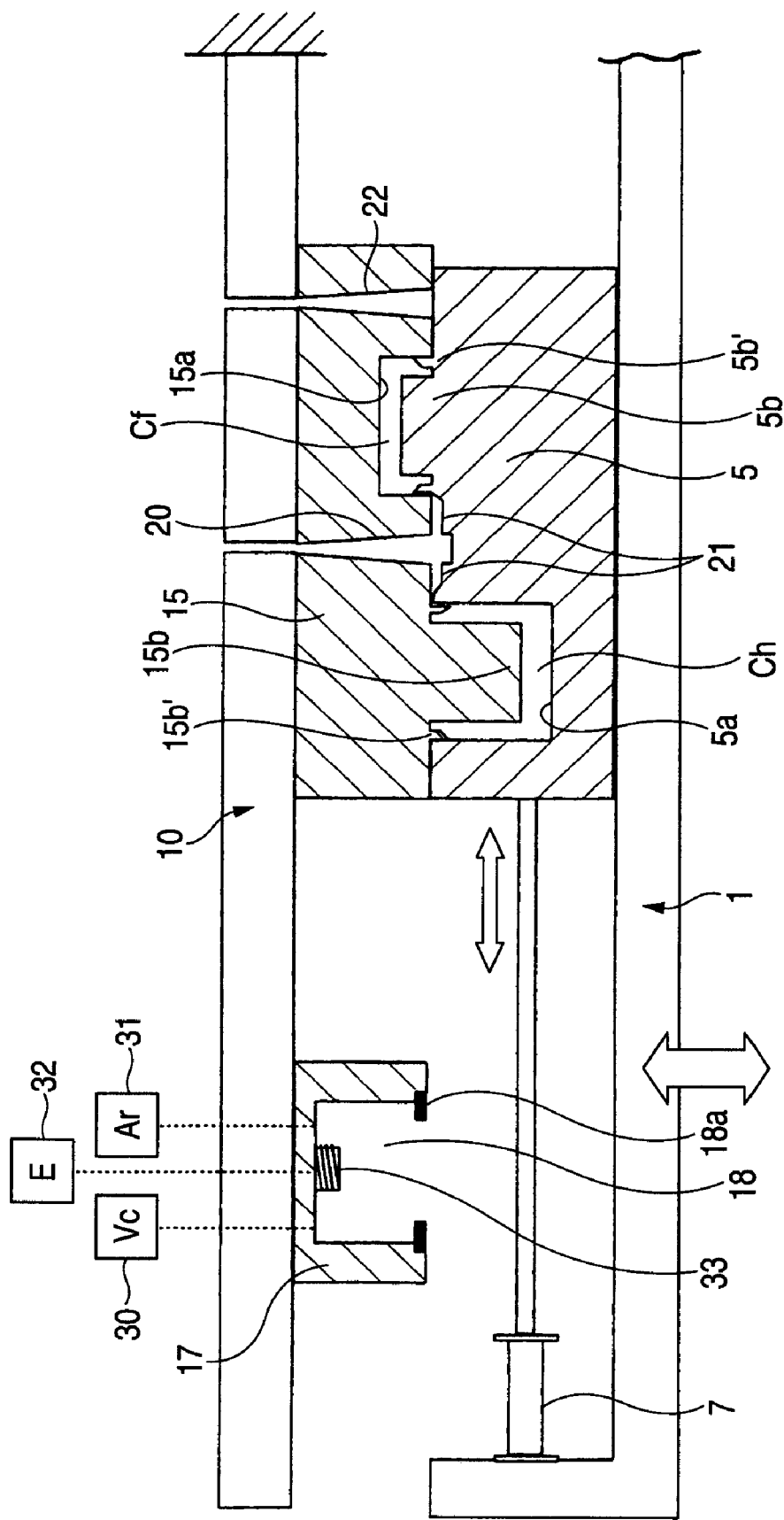
FIG. 2 is a sectional view schematically showing a specific embodiment of a first sliding die and a first fixed die and a sliding film forming chamber of the first embodiment shown in FIG. 1.

A detailed embodiment of the first sliding die 5, the first fixed die 15 and the sliding film forming chamber 18 described above is enlarged to be schematically shown in FIG. 2 in a die fastening state. In FIG. 2, the sliding die supporting member 2, the fixed die supporting member 11, the film forming chamber constituting member 17, the guide member 3 and the like are omitted. The movable disk 1 is to be able to open and close the die against the fixed disk 10. The first sliding die 5 is supported by the movable disk 1 slidably in the horizontal direction. The first sliding die 5 is moved by a driving member 7 such as a piston cylinder unit slidingly in the horizontal direction to take three pieces of different positions.

The parting line face of the first sliding die 5 is provided with a comparatively deep first sliding side recess portion 5a and the comparatively low first sliding side core 5b spaced apart from the first sliding die recess portion 5a by a predetermined intervals therebetween. In a surrounding of the first sliding core 5b, there is provided a small core 5b' for molding the bonding portion or the butting portion at a predetermined interval therefrom. The parting line face of the first fixed side die 15 includes a comparatively high first fixed side core 15b paired with the first sliding side recess portion 5a and the comparatively shallow first fixed side recess portion 15a paired with the first sliding side core 5b at a predetermined interval from the first fixed side core 15b. A surrounding of the first fixed side core 15b is also provided with a small core 15b' for molding the bonding portion at a predetermined interval therefrom. A cavity Ch for molding the main body portion is configured by the first sliding side recess portion 5a and the first fixed side core 15b. Similarly, a cavity Cf is configured by the first sliding side core 5b and the first fixed side recess portion 15a. A sprue 20 for primary molding is formed between the first fixed side core 15b and the first fixed side recess portion 15a of the first fixed die 15 constituted in this way. The sprue 20 is proximate to a side of the first sliding side recess portion 5a. Thereby, the main body portion and the lid member having different volumes are molded substantially simultaneously. The sprue 20 for primary molding is opened respectively to the first sliding side recess portion 5a and the first fixed side recess portion 15a by way of runners 21, 21 and gates. Further, the first fixed die 15 is also provided with a sprue 22 for secondary molding opened to the parting line face.

As described above, the second sliding die 6 includes the second sliding side recess portion 6a, the second sliding side core 6b, a small core and the like. The second fixed die 16 includes the second fixed side recess portion 16a, the second fixed side core 16b, a small core, a sprue and the like. Specific examples of these are not shown, because these can easily be understood from FIG. 2.

The sliding film forming chamber 18 is slidingly moved in a direction orthogonal to a paper face of FIG. 2 by a driving member such as a piston cylinder unit to take two different film forming positions. Since two positions can be taken, inner peripheral faces of the half hollow mold product, that is, the main body portion having different sizes and shapes can alternately be formed with films.

As for a film forming method of forming a thin film on an inner surface of the main body portion, related method can be used. For example, a sputtering method of forming a thin film by making a surface intended to be formed with a film and a target opposed to each other, applying a negative voltage of several kV to the target in an argon gas atmosphere of about several Pa through several tens Pa, a vacuum film forming method of forming a film by containing a surface to be formed with a film and an evaporation source at inside of a vacuum vessel, an ion plating method for forming a film in vacuum by applying a negative voltage of several kV to the surface and under a pressure of argon gas of several Pa and the like, and a chemical film forming method can be used. Although various methods are applicable in the invention, a sputtering apparatus is shown in FIG. 2. A board electrode constituting a film forming element of the sputtering apparatus is provided proximately to an opening portion of the sliding film forming chamber 18 and a target 33 is provided on a depth side, respectively. The electrodes are connected with a direct current or a high frequency power source and the board electrode is electrically connected to a board at inside of the die. A gas introducing tube for introducing an inert gas such as argon gas is opened and also a vacuuming tube is opened at inside of the sliding film forming chamber 18. The gas introducing tube, the vacuuming tube, power fed lines communicated to the electrodes and the like are respectively connected to a vacuum source 30 including an exhaust pump or the like necessary for vacuum film forming, an inert gas tank or inert gas supply source 31 for producing an inert gas such as carbon dioxide gas, a power source apparatus 32 and the like, respectively.

At first, an explanation will be given of a molding example in which by the molding apparatus shown in FIG. 2, the main body portion in the substantially bowl-like shape having the thin film such as the reflecting film at the inner surface and the lid member in the shape of the thin lens for closing the opening portion of the main body portion are subjected to primary molding by injection molding, further, the thin film is formed at the inner surface of the main body portion at inside of the die, successively, the opening portion of the main body portion is closed by the lid member, that is, subjected to the secondary molding to thereby provide the hollow mold product having the thin film at the inner surface. Then, an explanation will be given of a molding example of alternately providing different products having thin films at the inner surfaces by the molding apparatus shown in FIG. 1.

Figure 3A:
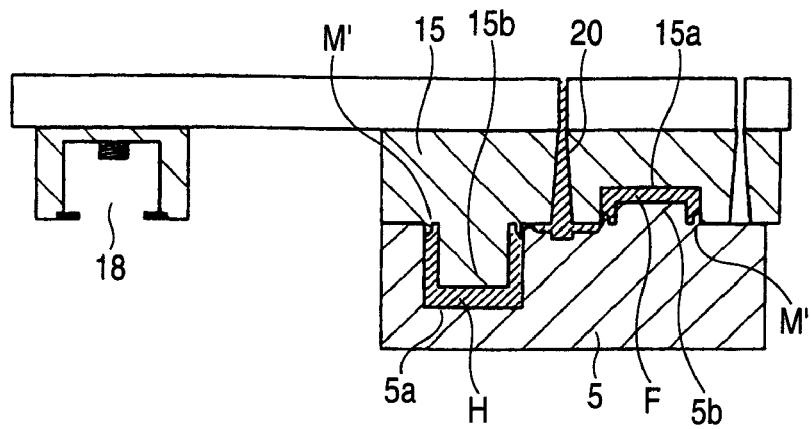

First, the first sliding die 5 is moved up to substantially middle positions of FIGS. 1 and 2. The substantially middle positions designate a primary molding position where the first sliding side recess portion 5a of the first sliding die 5 is matched with the first fixed side core 15b of the fixed die 15. At the same time, the first sliding side core 5b is matched with the first fixed side recess portion 15a of the first fixed die 15. Then, the movable disk 1 is fastened to the fixed disk 10. A state of fastening the dies is shown in FIG. 2. By fastening the dies, the cavity Ch for molding the main body portion is configured by the first sliding side recess portion 5a and the first fixed side core 15b. At the same timer the cavity Cf for molding the lid member is configured by the first sliding side core 5b and the first fixed side recess portion 15a. A molten resin is injected from the sprue 20 for primary molding in related method. Then, the molten resin is filled in the cavity Ch for molding the main body and the cavity Cf for molding the lid member by passing the sprue 20, the runners 21, 21 and the gates for primary molding. By the primary molding, the main body portion H and the lid member F are molded to provide half grooves M' for bonding at surroundings of the opening portions. A state of finishing the primary molding is shown in FIG. 3A.

Figure 3B:
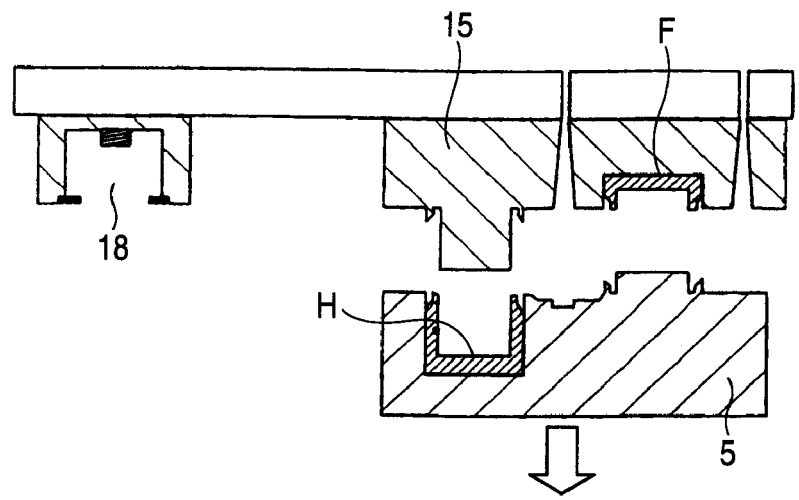
Figure 3C:
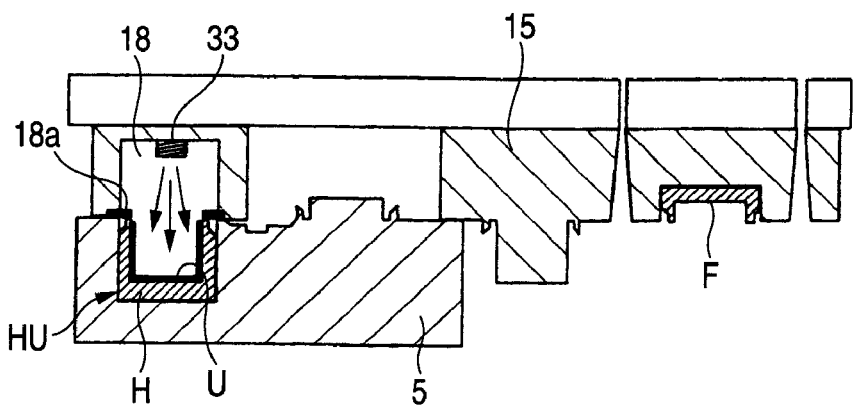

The first sliding die 5 is opened after awaiting for cooling and solidifying to some degree. The first sliding die 5 is opened such that the main body portion H remains on the side of the first sliding die 5 and the lid member F remains on the side of the first fixed die 15 depending on sizes, shapes and the like of half mold products. By opening the dies, the first sliding die 5 is made to be slidable and the inner surface of the main body portion H is exposed to the parting line face. The state is shown in FIG. 3B. The first sliding die 5 is slid to a right end portion in FIG. 1 and left film forming positions in FIGS. 2, 3. Then, the main body portion H remaining in the first sliding die 5 is matched with the sliding film forming chamber 18. The dies are fastened. A state of fastening the dies is shown in FIG. 3B. By fastening the dies, the half groove M' for bonding of the main body portion H is masked by the first masking plate 18a and inside of the sliding film forming chamber 18 is brought into a hermetically closed state Inside of the sliding film forming chamber 18 is brought into an argon gas atmosphere of about several Pa through several tens Pa by driving the vacuum source 30 and the inert gas supply source 31. Further, the target is applied with a negative voltage, the main body portion H is applied with the positive voltage of several CV and electricity is discharged. Then, the inner surface of the main body portion H is formed with the thin film U, and a main body portion HU having the thin film is provided.

Figure 4A:
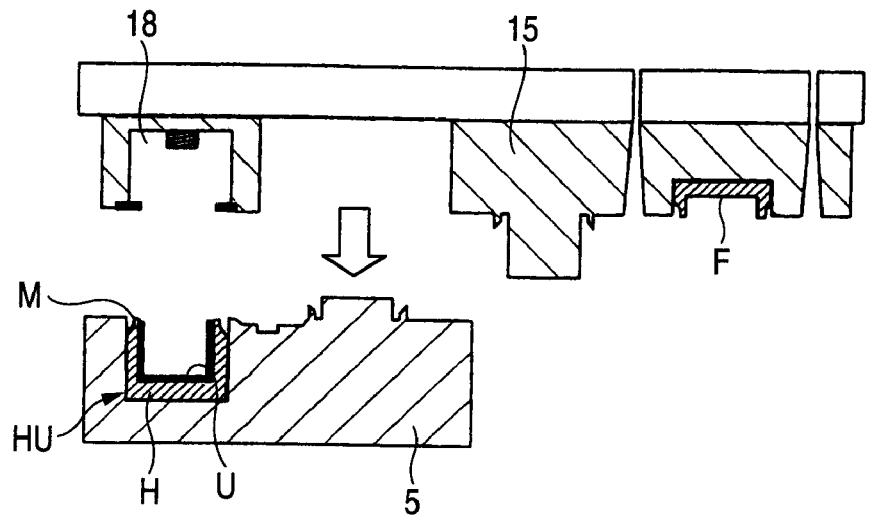
Figure 4B:
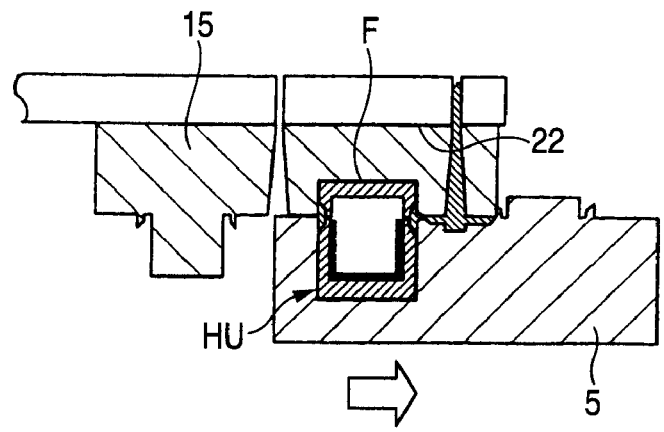
Figure 4C:
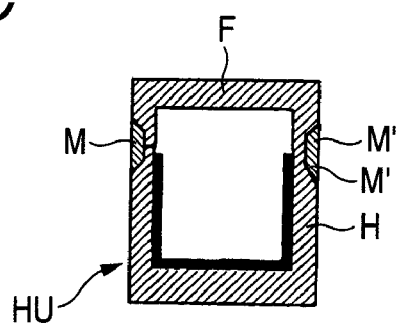

When the film forming has been finished, the dies are opened in a state in which the main body portion HU remains in the sliding die 5. A state of opening the dies is shown in FIG. 4A. Further, the first sliding die 5 is slid to a secondary molding position where the opening portion of the main body HU and the lid member F are matched. That is, the sliding die 5 is slid to a right side of FIG. 4B, and a left end portion of FIG. 1. The dies are fastened at the matching position. Then, as shown by FIG. 4C, the main body HU and the lid member F are butted together, and an outer peripheral portion of the butted portion is constituted with the bonding portion, that is, the cavity M for bonding by the half grooves M' M'. A molten resin is injected from the sprue 22 for secondary molding. The molten resin is filled in the cavity M for bonding. The main body HU and the lid member are integrated by the secondary molding. The first sliding die 5 is opened and the hollow mold product having the thin film at the inner surface is taken out. Molding is carried out in a similar manner as described above.

Next, an explanation will be given of an example of alternately molding a first product H*F1 and a second product H*F2 including the main body portion H having the thin film at the inner surface and the lid member F mainly in reference to FIGS. 5A to 5D. Injection molding is prepared (step S1). At step S2 of FIG. 5A, by the first sliding die 5 and the first fixed die 15, the main body portion H1 and the lid member F1 of the first product H*F1 are subjected to primary molding as described above. The position of the sliding die 5 at this occasion is a position shown in FIG. 3A. At step S3, cooling and solidifying are awaited. The first sliding die 5 is opened and slid to a film forming position. The sliding corresponds to FIGS. 3B and 3C. Molding of the second product H*F2 is being prepared.

At step S4, as shown by FIG. 5B, an inner surface of the main body portion H1 of the first product H*F1 is formed with a film and the main body portion H2 and the lid member F2 of the second product H*F2 are subjected to primary molding. That is, the first sliding die 5 is slid to the right end portion of FIG. 1 and the main body portion H1 remaining at the first sliding side recess portion 5a is matched to the sliding film forming chamber 18. The sliding film forming chamber 18 is moved to the upper side of FIG. 1. The first masking plate 18a masks the bonding portion of the main body portion H1. The second sliding die 6 is slid to substantially the center position in the transverse direction constituting the primary molding position. Further, the movable disk 1 is fastened to the fixed disk 10. As described above, the inner surface of the main body portion H1 is formed with the thin film, and the main body portion H2 and the lid member F2 of the second product H*F2 is subjected to primary molding by the second sliding die 6 and the second fixed die 16. Finishing of film forming of the main body portion H1 and cooling and solidifying of the main body portion H2 and the lid member F2 of the second product H*F2 are awaited (step S5).

At step S6, the movable disk 1 is opened and the first sliding die 5 is moved to the secondary molding position, that is, the left end and the main body portion HU1 finished with film forming is matched to the lid member F1 remaining at the first fixed die 15. Further, the second sliding die 6 is moved to the right end portion and the main body portion H2 is matched to the sliding film forming chamber 18. Further, the sliding film forming chamber 18 is moved to a lower side and the bonding portion of the main body portion H2 is matched to the second masking plate 18b. Successively, the movable disk 1 is fastened to the fixed disk 10. Such a state is shown in FIG. 5C. The molten resin is injected from the spure 22 for the secondary molding. Then, as explained in reference to FIGS. 4B and 4C, the main body portion HU1 formed with the film and the lid member F1 are integrated to provide the first product H*F1. At the same time, the inner surface of the main body portion H2 is formed with the film by the sliding film forming chamber 18.

After awaiting for cooling and solidifying the first product H*F1 and finishing to form the film to the main body portion H2, the movable disk 1 is opened. The first product H*F1 is projected. The first, the second sliding dies 5, 6 are made to be slidable (step S7) At step S8, the first sliding die 5 is slid to the primary molding position, that is, substantially the center position in FIG. 1. Further, the second sliding die 6 is moved to the left end portion of FIG. 1, that is, the secondary molding position. Further, the movable disk 1 is fastened. Successively, the molten resin is injected to the cavity configured by the first sliding die 5 and the first fixed die 15 and the main body portion H1 and the lid member F1 of the first product H*F1 are subjected to primary molding. Further, the molten resin for secondary molding is injected to the butting portions of the main body portion HU2 and the lid member F2 respectively held by the second sliding die 6 and the second fixed die 16 to integrate. The state is shown in FIG. 5D (step S8). The first, the second products H*F1, H*F2 are molded alternately or in parallel in a similar manner as described above.

The invention is not limited to the above-described embodiment. The invention may be embodied in various forms. For example, it is apparent that also a mold product formed with a thin film on one surface of a half mold product can be molded by applying the molding method or the molding apparatus described above. Similarly, also a mold product formed with a thin film on one surface of a half mold product and covering a surface of the thin film by a protecting cover can be molded. Further, according to the embodiment shown in FIG. 1, the film forming chamber is provided slidably in the up and down direction. However, the invention can be embodied such that the film forming chamber is configured by a size capable of covering the first, the second sliding dies, the masking plates are provided to be spaced apart from each other by an interval in the up and down direction, and an unnecessary masking plate is closed mechanically at each time. Further, although a kind of the molten resin has not been explained particularly, it is apparent that the main body portion and the lid member can be molded by different resins. It is also apparent that the main body portion and the lid member can be subjected to secondary molding by different resins.

What is claimed is:

1. A molding apparatus of a mold product having a thin film at an inner surface thereof comprising:
    a fixed disk including:
    a fixed die including a fixed side core and a fixed side recess portion; and
    a film forming chamber including therein a film forming element, the film forming chamber being separately provided from the fixed die; and
    a movable disk that opens and closes to the fixed disk, the movable disk including:
    a sliding die including a sliding side core and a sliding side recess portion, the sliding die slides within the movable disk to a position where the sliding side recess portion matches with the film forming chamber,
    wherein the sliding die slides to positions including:
    a primary molding position where the sliding side core and the slide side recess portion are respectively matched with the fixed side recess portion and the fixed side core for molding a pair of mold products;
    a film forming position where the film forming chamber is matched with the sliding side recess portion including one half mold product of the pair of mold products molded at the primary molding position for forming a thin film on a surface of the one half mold product; and
    a secondary molding position where the sliding side recess portion including the one half mold product is matched with the fixed side recess portion including another half mold product of the pair of half mold products molded at the primary molding position for bonding the one half mold product and the another half mold product of the pair of half mold products,
    wherein the fixed disk further includes:
    a second fixed die including a second fixed side core and a second fixed side recess portion,
    wherein the movable disk further includes a second sliding die including a second sliding side core and a second sliding side recess portion, and
    wherein the second sliding die slides to positions including:
    a second primary molding position where the second sliding side core and the second sliding side recess portion are respectively matched with the second fixed side recess portion and the second fixed side core for molding a second pair of half mold products;
    a second film forming position where the film forming chamber is matched with the second sliding side recess portion including one half mold product of the second pair of mold products for forming a thin film on a surface of the one half mold product of the second pair of mold products; and
    a second secondary molding position where the second sliding side recess portion including the one half mold products of the second pair of half mold products is matched with the second fixed side recess portion including another half mold product of the second pair of half mold products molded at the second primary molding position for fastening the one half mold product and the another half mold product of the second pair of half mold products,
    wherein the first sliding die and the second sliding die slide in directions reverse to each other, and
    wherein the film forming chamber slides to positions including:
    a first position that matches with the sliding side recess portion including the one half mold product of the pair of half mold products; and
    a second position that matches with the second sliding side recess portion including the one half mold product of the second pair of half mold products.

2. The molding apparatus according to claim 1, wherein the first fixed die and the second fixed die are attached to the fixed disk in a relationship of upper and lower stages,
    wherein the first sliding die and the second sliding die are provided to the movable disk in a relationship of upper and lower stages and slide in the transverse direction, the sliding side core and the sliding side recess portion are provided in the transverse direction to be spaced apart from each other by a predetermined interval there between, and the second sliding side core and the second sliding side recess portion are provided in the transverse direction to be spaced apart from each other by a predetermined interval there between, and
    wherein the film forming chamber is attached to the fixed disk to be remote from the first and the second fixed dies by a size of covering the recess portions of the first and the second sliding dies molded with one half mold products of the pair and the other pair of half mold products.

3. The molding apparatus according to claim 2,
    wherein the fixed side core and the fixed side recess portion are provided in a transverse direction to be spaced apart from each other by a predetermined interval there between, and
    wherein the second fixed side core and the second fixed side recess portion are provided in a transverse direction to be spaced apart from each other by a predetermined interval there between.

4. The molding apparatus according to claim 1,
    wherein the film forming chamber includes an opening portion,
    wherein the opening portion includes a masking plate for masking a portion of the one half mold product included in the sliding side recess portion to be bonded to the another half mold product, and
    wherein the masking plate seals the opening portion.

5. The molding apparatus according to claim 4,
    wherein a face of the opening portion is at a height substantially the same as a height of a parting line face of the fixed die and the sliding die.

6. The molding apparatus according to claim 1,
    wherein the film forming element includes a target electrode, a board electrode, and a vacuuming tube.

* * * * *